June 9, 1964

D. NICOLL ETAL 3,136,432

TRANSFER MECHANISM

Filed Aug. 2, 1961

Inventors
David Nicoll
Mitchell E. Timin

By Roland A. Anderson
Atty.

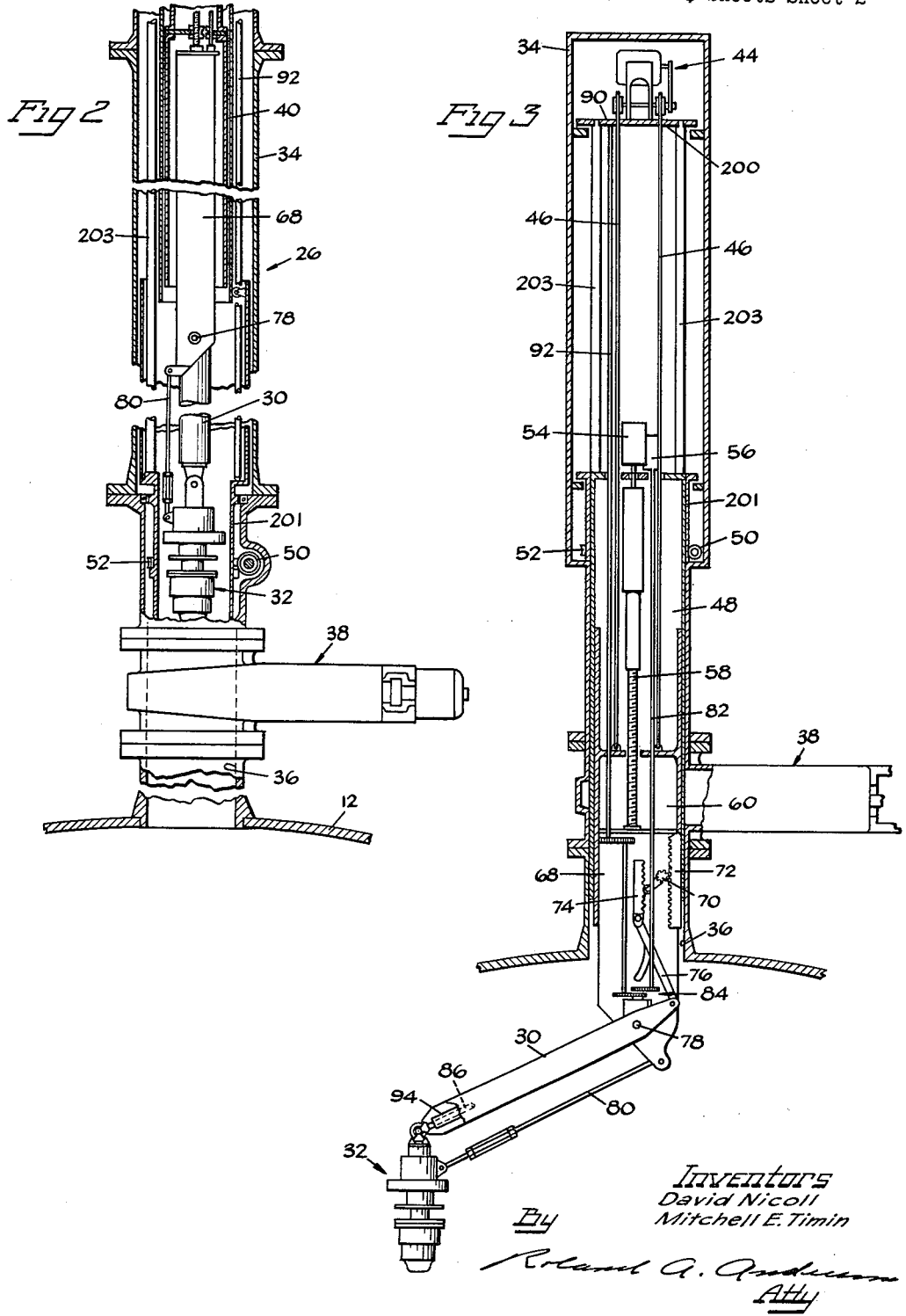

United States Patent Office 3,136,432
Patented June 9, 1964

3,136,432
TRANSFER MECHANISM
David Nicoll, La Jolla, and Mitchell E. Timin, San Diego, Calif., assignors, by mesne assignments, to the United States of America as represented by the United States Atomic Energy Commission
Filed Aug. 2, 1961, Ser. No. 128,911
12 Claims. (Cl. 214—28)

The present invention relates generally to transfer mechanism and is more particularly concerned with an improved lifting mechanism for use in connection with the handling of fuel elements and the like in nuclear reactors.

In transfer mechanism of the type which is used to lift and re-position items, it is frequently desirable that such lifting or hoisting mechanism be particularly precise in its movement and yet be adaptable for use under many varying circumstances. This is particularly true in connection with the fuel transfer mechanism required in handling of fuel elements and other core components within a nuclear reactor. In such case, it is required that the transfer mechanism be precisely controlled at all times, and that the grappler portion of such mechanism be accurately positionable within the pressure vessel. Then too, in the transfer of fuel elements relative to the reactor core, it is important that the transfer mechanism be capable of re-positioning a single element within the pressure vessel without substantially disturbing the remainder of the elements in the reactor core. Of course, it is also required that all of the movements of the transfer mechanism within the pressure vessel of a nuclear reactor be controlled from a position outside of the pressure vessel, and that the movements of the transfer mechanism be accurately recorded at such outside position.

It is the primary object of the present invention to provide a novel form of transfer mechanism, including means for maintaining precise control over the transfer mechanism. A further object of the invention is to provide a novel form of transfer mechanism which is particularly adapted for insertion within the pressure vessel of a nuclear reactor, and wherein the grappler portion of the transfer mechanism may be accurately controlled from a remote position. Still another object of the invention is to provide a grappler means including a supporting frame and a grappler body, wherein the grappler body is permitted to have limited lateral movement relative to the supporting frame. Still another object is to provide a transfer mechanism including a grappler which is adapted to be inserted within the pressure vessel of a nuclear reactor, wherein the grappler is provided with means for accurately aligning the grappler with a fuel element, means for holding the adjoining fuel elements in position while engaging and lifting the selected fuel element, and wherein the grappler is articulated to permit some angular deviation of the grappler relative to the vertical axis of the nuclear reactor without diminishing the effectiveness of the grappler mechanism. Further objects and advantages will become apparent from the following description and the drawings, wherein;

FIGURE 2 is an enlarged, fragmentary sectional view of the fuel transfer mechanism;

FIGURE 3 is a simplified, schematic illustration of the transfer mechanism showing the grappler positioned within the pressure vessel of the nuclear reactor.

As indicated previously, this invention relates particularly to transfer or lift means of the type wherein precision movement of the grappler or article-engaging portion of the transfer mechanism is desired. One application wherein the greatest degree of precision is required is in connection with the handling of removable elements relative to the core assembly of a nuclear reactor and the selected embodiment of the present invention is particularly concerned with such use.

Figure 1:
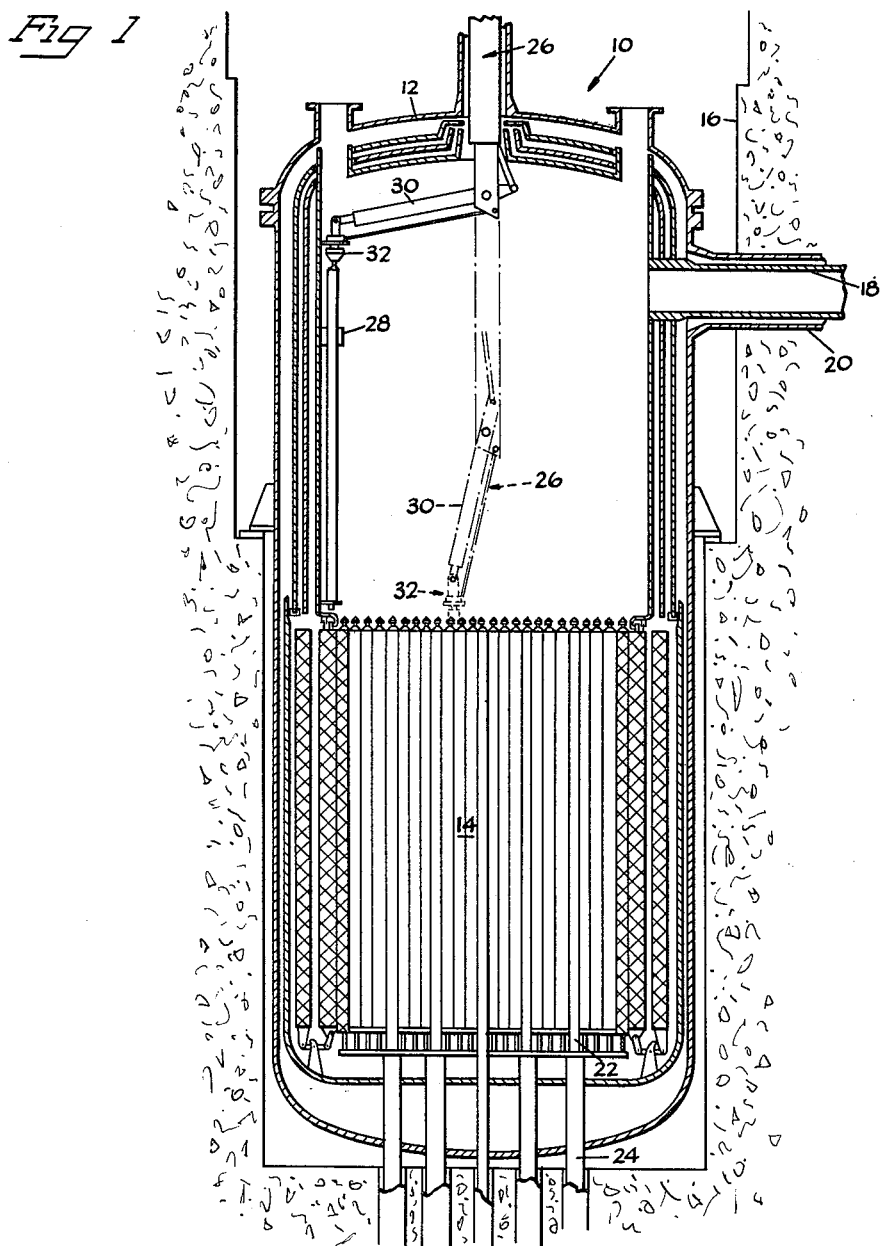
FIGURE 1 is a schematic illustration of a nuclear reactor, including the transfer mechanism.

More particularly, as seen in FIGURE 1, there is illustrated schematically a nuclear reactor 10 of the gas-cooled type, wherein there is provided a pressure vessel 12 for containing the reactive core assembly 14. The pressure vessel 12 is shown as being mounted in a cavity formed in a concrete structure 16 or the like, and the upper portion of the vessel is provided with a plurality of ports or passages which are capable of being sealed and which afford entry into the pressure vessel for servicing, such as replacement of spent fuel elements and the like. A coolant gas is introduced into the pressure vessel and is circulated therethrough, so as to cool the upper portion of the vessel and the reflector portion surrounding the fuel elements in the core, and the gas then passes upwardly through the core 14 in suitable passages provided in the fuel elements and in the area surrounding such fuel elements, to thereby absorb the heat created by the nuclear reactivity within the core. The heated gases will then discharge through an inner outlet duct 18, concentrically arranged with respect to an inlet duct 20, to a means, such as a steam generator, where the heated gases are converted into energy.

The reactivity within the core 14 is regulated by a plurality of control rods 22 which are disposed throughout the core and which are vertically movable relative to the core by means of suitable drive mechanism 24 located below the pressure vessel. Throughout the life of the reactor, there is, of course, dissipation of the fuel elements and means must be provided for replacing the spent fuel elements. In the illustrated structure, this is provided by the fuel transfer mechanism 26 which is normally positioned outside of, and above, the pressure vessel, but which is adapted to be inserted through a suitably valved opening into the pressure vessel for withdrawal of elements or the like from the core. The withdrawn elements are placed in temporary storage racks 28 along the inner wall of the vessel in position below one of the charging ports for subsequent withdrawal and handling by suitable mechanism, not shown.

It is very essential that the fuel transfer mechanism be operable in a manner such that the grappler portion at the lower end thereof may be accurately positioned with respect to the fuel element to be handled, and so that the withdrawal of such fuel element can be accomplished without disturbing the remainder of the core assembly. In the illustrated embodiment, this is achieved generally by constructing the transfer mechanism 26 of a plurality of telescoping, tubular sections with the lowermost section pivotally supporting a radius arm 30 which carries the grappler body 32 at its outer end. The tubular sections can be extended to place the lower end within the pressure vessel at a predetermined position, and the radius arm and grappler body are then movable to a position of engagement with any selected element, control rod or the like within the reactor core. Furthermore, the illustrated apparatus is constructed and arranged so that the grappler body 32 is fixedly oriented about its vertical axis during movement of the body within the core, and so that the grappler body is elevated to a predetermined height, regardless of its radial positioning within the core, so that any subsequent radial movement of the grappler body, as between the reactor core and the storage racks, is in a horizontal plane.

More particularly, referring to FIGURES 2 and 3 of the drawings, it is seen that the transfer mechanism 26 includes an elongated, outer housing 34 which is fixedly positioned and supported on top of a centrally located port 36 in the top of the pressure vessel 12. A suitable valve means 38 is provided intermediate the transfer mechanism housing and the pressure vessel port, in order to permit sealing of the transfer mechanism housing with respect to the pressure vessel.

Within the outer housing 34 of the transfer device, there is located a plurality of tubular, telescoping sections which are adapted to be moved axially of the reactor vessel and relative to one another. More particularly, there is an outer guide tube 40 which surrounds the operational components of the lifting device and which has a generally circular, horizontal plate 200 fixed at its upper end. The circular plate 200, mounted by ball bearings to the outer housing 34, has mounted thereon an electric motor powered cable reel 44 and the lower end of the cable 46 is attached to one of the telescoping sections 48. Moreover, the guide tube 40 is rotatably supported within the outer housing for axial rotation, so that it can be oriented in any selected position of rotation about the axis of the reactor vessel. In this respect, an azimuth means is provided which includes a motor driven worm gear 50 that is disposed in meshing engagement with a ring gear fixed to the outer surface of the guide tube housing 201. Consequently, operation of the worm 50 is effective to rotate the guide tube 40, the circular plate 200 and reel 44, through means of torque shaft 203, and all of the operating components within the guide tube.

A second tubular section 48 is disposed within the guide tube 40 and is non-rotatably secured thereto in a manner affording relative axial movement therebetween. The second section 48 includes an indexing drive motor 54 and a grappler hook drive motor 56 at its upper end. The indexing motor 54 is connected, by means including telescoping shafts 58, with a radial arm indexing carriage 68 within tubular section 60 to provide for axial movement of the carriage. The latter carries a radius arm drive gear 70 in position to move over a stationary rack 72 on tube 60, and gear 70 in turn transmits axial motion to a slidable rack 74 to impart motion through a link 76 to the radius arm 30 so as to swing the latter about its fulcrum pin 78. Generally, the described arrangement is designed to raise the grappler head 32 the same distance that the carriage 68 travels downwardly, to thereby maintain the grappler head in a horizontal plane of predetermined height above the core while it is being adjusted in a radial direction. In this respect, it is also seen that there is provided an adjustable link 80, which is pivotally connected between the lower end of the carriage 68 and the grappler 32, to provide a parallel link support for the grappler.

The grappler drive motor 56 is connected, through means including telescoping shafts 82, with a gear arrangement 84 at the lower end of the indexing carriage 68. Drive for the grappler is then carried by a control drive shaft 86 which extends through the radius arm 30 to the grappler body 32.

Means are also provided for maintaining the lower portion of the grappler body 32 in a fixed position during azimuth rotation of the radius arm 30. Such means includes a stationary ring gear (not shown) for driving a gear 90 at the upper end of housing 34, which drive gear is connected, through means including telescoping shafts 92, with a hollow drive shaft 94 arranged concentrically with grappler drive shaft 86 within the radius arm 30. Generally, this arrangement permits counter-rotation of the grappler during azimuth rotation of the telescoping tubes 40, 48 and 60 to maintain the grappler in fixed position, and it also permits independent rotation of the grappler when desired. A motor-gear unit (not shown) is used to lock the ring gear into position and to adjust for the grappler head zero position.

The following portion of the description is particularly directed to the structure and operation of the grappler 32, with the latter related to the concentric drive shafts 86 and 94 mentioned above. For a more detailed description of means for positioning a grappler relative to a reactor core, attention is directed to the copending application of Peter Fortescue et al., Serial No. 775,578, filed November 21, 1958.

Figure 4:
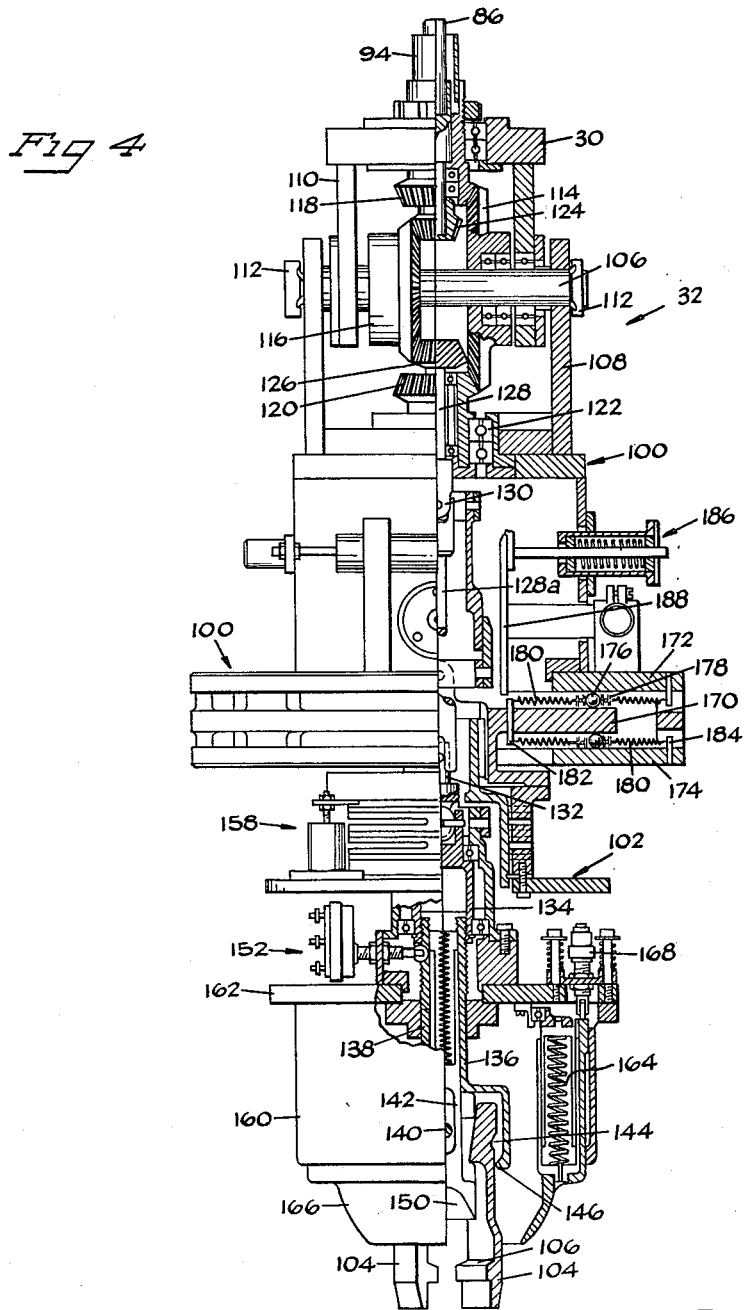
FIGURE 4 is a side elevation, partly in section, of the grappler portion of the transfer mechanism seen in the preceding drawings.

With reference particularly to FIGURE 4, it will be seen that the grappler body includes generally an upper housing portion 100 and a lower housing portion or head 102, with the latter incorporating the grappler hooks or jaws 104 which are adapted to releasably engage the lifting knob portion of a fuel element, control rod and the like. The upper housing portion 100 is pivotally connected to the lower end of the radius arm 30 by means of a transverse shaft or fulcrum pin 106 extending through aligned openings in a yoke portion 108 on the upper end of the upper housing 100 and a yoke portion 110 on the lower end of the radius arm 30. This shaft is axially fixed in position by means of a pair of locking nuts 112 or the like, and the shaft has rotatably mounted thereon a large bevel gear 114 and a smaller bevel gear 116, which are utilized in transmitting the drive from the shafts 86 and 94 to the grappler 32. The larger bevel gear 114 is disposed in meshing engagement with a first pinion gear 118, which is fixed to the lower end of the hollow outer drive shaft 94 which extends through the radius arm 30 and is connected with the ring gear (not shown) for indexing the grappler body about its vertical axis. The larger gear 114 is also in meshing engagement with a bevel pinion gear 120, which is fixedly positioned relative to the lower housing portion 102 and carried by bearing means 122 for rotation relative to the upper housing 100. Consequently, it will be seen that rotation of the outer drive shaft 94 is effective to rotate the lower portion 102 of the grappler body about a vertical axis. Furthermore, the described gear arrangement permits angular movement between the radius arm 30 and the grappler body 32, without affecting the indexing of the lower housing portion.

The smaller bevel gear 116 on the transverse shaft 106 is in meshing engagement with a second pinion 124 on the lower end of the central drive shaft 86 that is connected through the suitable means with the motor 56 for operating the grappler jaw structure. The drive from the center shaft 86 is transmitted through the pinion 124 to the bevel gear 116 and then to a second pinion 126 which is fixed on the upper end of an axially located shaft 128 within the grappler housing. This axial shaft 128 includes a central section 128a, which is connected through universal couplings 130 and 132 with the upper section of the shaft 128 and with a grappler jaw actuating nut 134, respectively. The lower universal joint 132 includes a pin and slot arrangement (not shown) which affords lengthening and shortening of the effective length of the shaft for reasons to be described later.

The grappler jaw actuator nut 134 threadedly engages the jaw actuator 136 which includes a spring biased plunger 138 which extends downwardly and axially of the grappler hooks 104. Vertical movement of the actuator 136 is effective to open and close the grappler hooks. More particularly, the grappler hooks 104 are generally arcuate in transverse section and are pivotally interconnected by means including a pin 140 which extends transversely of a vertically elongated slot 142 in the lower end of the plunger 138. The lower inner faces of the jaws or hooks 104 include an inwardly projecting ledge 106 which is adapted to provide the supporting engagement with the lifting knob of a fuel element. The outer surface of the grappler hooks include an annular groove 144 having an upwardly inclined wall portion, which is adapted to be engaged by the grappler hook actuator to open the jaws. Axial movement of the actuator 136, in response to rotation of the central drive shaft 128 and the nut 134 thereon, results in vertical movement of the actuator relative to the grappler hooks. As the actuator 136 moves upwardly, an annular cam surface 146 internally of the lower end of the actuator moves into the recess 144 and cams the grappler hooks 104 into an open position, and as the actuator moves downwardly, the cam surface 146 moves along the generally straight wall of the actuator 136 and closes the grappler hooks 104 against the fuel element lifting knob.

The plunger 138 located centrally of the grappler hooks includes a cavity 150 at its lower end portion, which is adapted to engage the upper end of the lifting knob of a fuel element. Furthermore, this plunger has associated therewith a micro-switch 152 which is operable to indicate engagement of the plunger with a lifting knob and also to stop downward travel of the grappler at the correct position to pick up an element. There is also associated with the plunger and grappler hooks a weighing device, indicated generally at 158, which is operable to indicate the force on the grappler hooks, whether a compressive force resulting from initial engagement with a fuel element, or the amount of tension resulting from the weight of a fuel element being lifted by the grappler hooks. Meter contacts on the weighing device are used as a secondary back up control for micro-swtich 152 in case it should be come inoperative during stopping of downward travel of the grappler body 32.

Surrounding the grappler hooks 104 is a generally cylindrical housing 160 which is mounted on a support plate structure 162 and which is biased by a plurality of springs 164 into a position away from the supporting plate. The lower, outer edge portion 166 of this cylindrical housing 160 is shaped to conform with the shape of the lifting knobs of the fuel elements, so that as the grappler body moves toward one of the fuel elements the surrounding housing section 166 engages and holds down the adjoining fuel elements. The springs 164 serve as a cushioning means to provide any undue transmittal of shock forces to the grappler body. Furthermore, the upward movement of the cylindrical housing 160 as it engages the surrounding fuel elements is transmitted through a micro-switch 168 to a suitable indicating device (not shown) located remotely of the pressure vessel. The cylindrical housing 160 is adapted to initially engage the surrounding fuel elements and hold them in position prior to the lowering of the grappler hooks into position on the selected element. Furthermore, this cylindrical housing maintains its hold-down forces on the surrounding fuel elements during the initial lifting of the selected element, so that the latter is freed from the core without disturbance of the adjoining elements.

The lower housing portion 102 of the grappler body 32 is supported for limited tilting and transverse movement with respect to the upper housing portion 100. More particularly, the upper part of the lower housing portion includes a generally circular plate 170 which is carried between a pair of spaced apart plates 172 and 174 fixed on the lower end of the upper housing portion 100. Intermediate these three plates are disposed a pair of bearing means comprising a race including ball bearings 176, with the individual ball bearings being carried in a ring 178 which is connected by tension springs 180 of equal strength at diametrically opposed positions. The free end of the inner spring 180 is fixed to a pin 182 on the intermediate plate 170, and the free end of the outer spring 180 is fixed to a pin 184 on the adjoining plate (172 or 174) of the upper housing portion. The bearing race 178 permits limited transverse movement of the balls. Consequently, the intermediate plate 170 supporting the lower housing portion is free to move transversely relative to the upper housing portion 100. However, since the tension springs acting on the ball bearings are of equal strength, the movement of the ball bearings will be approximately one-half the distance of movement of the supporting intermediate plate. This arrangement affords some misalignment of the grappler hooks 104 with respect to the main grappler body which is necessarily of substantial length. Furthermore, it also permits some relative axial movement between the upper and lower housing portions. In this latter respect, the lower housing portion 102 is yieldably maintained in axial alignment with the upper housing portion by means of a pair of spring devices 186 which act against a cylindrical extension 188 of the lower housing portion 102. The springs (only one of which is shown) are disposed along axes which are at 90° with respect to each other.

Thus, it is seen that there is provided a grappler body which is permitted vertical swinging movement relative to its supporting radius arm, and which affords indexing of the grappler body about a vertical axis while maintaining the grappler hooks in fixed relation about such axis. Moreover, there is provided means for holding down the adjoining fuel elements, while engaging and lifting the selected element, and means permitting some adjusting movement of the lower end of the grappler body relative to the upper portion of the body in order to avoid obstructions and to compensate for minor variations in the positioning of the grappler.

Although shown and described with respect to particular apparatus, it will be apparent that modifications might be made, without departing from the principles of this invention.

What is claimed is:

1. In a transfer device for lifting articles, a grappler comprising an upper body portion and a lower body portion, means rotatably supporting said lower body portion upon said upper body portion in longitudinal alignment, said means including a resilient suspension providing limited transverse displacement of said lower body portion with respect to said upper body portion with maintained longitudinal alignment therebetween, a plurality of grappler hooks pivotally carried by said lower body portion to provide relative swinging movement therebetween, grappler hook actuating means on said lower body portion which is selectively movable to effect controlled movement of said grappler hooks relative to one another, and means connected with said actuating means and extending upwardly through said upper body portion which is selectively operable to effect movement of said hook actuating means.

2. In a transfer device for lifting articles, a power operated grappler comprising an upper body portion and a lower body portion, means rotatably supporting said lower portion on said upper portion in longitudinal alignment, said means including a resilient centering suspension providing limited transverse displacement of said lower body portion with respect to said upper body portion with maintained alignment therebetween, a plurality of grappler hooks pivotally carried by said lower body portion to provide relative swinging movement therebetween, grappler hook actuating means on said lower body portion which is selectively movable to effect controlled movement of said grappler hooks relative to one another, and drive means connected with said actuating means and extending upwardly through said upper body portion for connection with a power drive means which is selectively operable to thereby effect movement of said hook actuating means.

3. In a transfer device for lifting articles, a power operated grappler adapted to be pivotally mounted on one end of a movable frame structure, said grappler comprising an upper body portion and a lower body portion, means rotatably supporting said lower portion on said upper portion in axial alignment therewith, said means including a resilient suspension providing limited transverse movement of said lower portion relative to said upper body portion with maintained alignment therebetween, a plurality of grappler hooks pivotally carried by said lower body portion to provide relative swinging movement therebetween, grappler hook actuating means on said lower body portion which is selectively vertically movable to effect controlled movement of the grappler hooks relative to one another to thereby open and close said hooks, and drive means connected with said actuating means and extending upwardly through said upper body portion and adapted for connection with a power drive means on said frame structure which is selectively operable to thereby effect movement of said hook actuating means to open and close said grappler hooks.

4. In a transfer device for lifting articles, a movable frame structure, a powered drive means on said frame structure, a power operated grappler pivotally mounted on one end of said frame structure and comprising an upper body portion and a lower body portion, means rotatably supporting said lower portion on said upper portion, said means including a suspension member supported by bearing means allowing transverse displacement and biasing spring means affording limited transverse movement of said lower portion relative to a position of axial alignment with said upper body portion, a pair of grappler hooks pivotally carried by said lower body portion to provide relative swinging movement therebetween about a horizontal axis, grappler hook actuating means on said lower body portion which is selectively movable to engage said grappler hooks and effect controlled movement of said grappler hooks relative to each other, drive means on said grappler which is connected with said actuating means and extends upwardly through said upper body portion for connection with said power drive means on said frame structure, and additional drive means on said grappler which is connected with said lower body portion and with said powered drive means in a manner affording rotation if said lower body portion by said powered drive means.

5. In a transfer mechanism for engaging and lifting articles, a grappler comprising an upper body portion and a lower body portion, means rotatably supporting said lower body portion on said upper body portion in longitudinal alignment, said means including a suspension for said lower body portion having an alignment member supported by bearing means permitting transverse displacement and biasing spring means affording limited transverse movement of said lower body portion relative to said upper body portion, jaw mechanism carried by said lower body portion and operable to releasably engage an article, said jaw mechanism comprising a plurality of jaw elements pivotally mounted intermediate their upper and lower ends for relative swinging movement about a generally horizontal axis, and a jaw actuating means disposed for engagement with said jaw elements and operative to thereby open and close said jaw elements, and power driven means for controlling the movement of said jaw actuating means comprising an articulated driven shaft extending lengthwise of said upper and lower body portions and connected at its lower end with said jaw actuating means in a manner affording vertical movement of the latter in response to rotation of said shaft.

6. In a transfer mechanism for engaging and lifting articles, a grappler comprising an upper body portion and a lower body portion, means rotatably supporting said lower body portion on said upper body portion in vertical axial alignment, said means including a suspension for said lower body portion including a member supported by bearing means permitting transverse displacement and biasing spring means providing limited transverse movement of said lower body portion relative a position of axial alignment with said upper body portion, jaw mechanism carried by said lower body portion and operable to releasably engage an article, said jaw mechanism comprising a pair of jaw elements pivotally mounted intermediate their upper and lower ends for relative swinging movement about a generally horizontal axis, means defining vertically extending cam surfaces on the outer surface of said jaw elements, and a jaw actuating means disposed for vertical movement along said cam surfaces to thereby open and close said jaw elements, and power driven means for controlling the movement of said jaw actuating means comprising an articulated, rotatable shaft means extending lengthwise of said upper and lower body portions and connected at its lower end with said jaw actuating means to produce vertical movement of the latter in response to rotation of said shaft, said shaft including universal joints and extensible portions to permit said relative rotation between said upper and lower body portion and to permit said relative transverse movement between said body portions without affecting the selected positioning of said jaw actuating means.

7. A transfer mechanism for engaging and lifting articles comprising a supporting frame structure, an arm carried by said frame structure for relative swinging movement, a grappler pivotally supported on the end of said arm and comprising an upper body portion and a lower body portion, means rotatably supporting said lower body portion on said upper body portion in alignment with respect to a vertical axis, said means including a suspension for said lower body portion supported by bearing means permitting horizontal displacement and biasing spring means for aligning said lower body portion with said upper body portion providing limited transverse and affording limited transverse movement of said lower body portion relative to said upper body portion, jaw mechanism carried by said lower body portion and operable to releasably engage an article, said jaw mechanism comprising a pair of jaw elements pivotally mounted intermediate their upper and lower ends for relative swinging movement about a generally horizontal axis, means defining generally vertically extending cam surfaces on the outer surface of said jaw elements, and a jaw actuating means comprising a generally cylindrical element encircling said jaw elements and disposed for engagement with said cam surfaces to open and close said jaw elements, and power driven means for controlling the movement of said jaw actuating means comprising an articulated driven shaft extending lengthwise of said grappler and having a nut at its lower end which is threadedly engaged with said jaw actuating means to actuate vertical movement of the latter in response to rotation of said shaft and said nut, said shaft being arranged to permit said relative transverse movement between said body portions without affecting the positioning said jaw actuating means as determined by the rotation of said driven shaft, and power means on said frame structure connected with said driven shaft on said grappler.

8. In a transfer mechanism for engaging and transferring an article while maintaining the article in a predetermined orientation relative to its vertical axis, a power operated grappler comprising an upper body portion provided with a radially disposed bearing surface portion, a lower body portion having a radially oriented supporting portion engaging said upper body bearing surface portion thereby being axially aligned and rotatably mounted with respect thereto as well as being arranged to permit limited transverse motion of the lower body portion with respect to the upper body portion, resilient biasing means disposed in a substantially transverse plane and coupling between said upper and lower body portions for yieldably maintaining said body portions in axial alignment, a first drive means extending through said upper body portion and connected with said lower body portion in a manner affording controlled rotation of the latter about its axis, a grappler jaw carried by said lower body portion and operable to releasably engage an article, a jaw actuating means disposed for engagement with said grappler jaw to open and close the latter, and a second drive means extending through said upper body portion and terminating at its lower end in a connection with said grappler jaw actuating means whereby rotation of said second drive means is effective to selectively open and close said grappler jaw, said first and second drive means being coaxially disposed in said grappler and arranged to permit said relative movements between said body portions without affecting the selected positioning of said grappler jaw.

9. In a transfer mechanism for engaging and transferring an article while maintaining the article in a predetermined orientation relative to its vertical axis, a power operated grappler comprising an upper body portion provided with horizontally disposed parallel bearing surfaces, a lower body portion having a horizontally disposed planar element supported by said bearing surface so as to permit limited transverse movement, said lower body portion being rotatable with respect to said upper body portion and vertically aligned therewith, resilient biasing means coupling said upper and lower body portions for yieldably maintaining said body portions in axial alignment, a first drive means extending through said upper body portion and connected with said lower body portion in a manner affording controlled rotation of the latter about its axis, a grappler jaw carried by said lower body portion and operable to releasably engage an article, said jaw mechanism comprising a pair of elongated jaw elements generally arcuate in cross-section and pivotally mounted intermediate their ends for relative movement about a generally horizontal axis, means defining vertically extending cam surfaces along the outer surfaces of said jaw elements, a jaw actuating means comprising a generally cylindrical element disposed coaxially of said jaw elements and having cam means internally thereof in position for movement along the cam surfaces on said jaw elements to open and close the latter, and a second drive means extending through said upper body portion and terminating at its lower end with a rotatable nut which threadedly engages said jaw actuating means so as to provide for axial movement of the latter in response to rotation of said second drive means, said first and second drive means being coaxially disposed in said grappler and arranged to permit said relative movements between said body portions without affecting the selected positioning of said jaw elements as determined by said second drive means.

10. In a transfer mechanism for engaging and transferring and article while maintaining the article in a predetermined orientation relative to its vertical axis, a power operated grappler comprising an upper body portion provided with horizontally disposed parallel bearing surfaces, a lower body portion having a horizontally disposed planar element supported by said bearing surface so as to permit limited transverse movement, said lower body portion being rotatable with respect to said upper body portion and vertically aligned therewith, resilient biasing means coupling said upper and lower body portions for yieldably maintaining said body portions in axial alignment, a first drive means extending through said upper body portion and connected with said lower body portion in a manner affording controlled rotation of the latter about its axis, a grappler jaw carried by said lower body portion and operable to releasably engage an article, said jaw mechanism comprising a pair of elongated jaw elements generally arcuate in cross-section and pivotally mounted intermediate their ends for relative movement about a generally horizontal axis, means defining vertically extending cam surfaces along the outer surfaces of said jaw elements, a jaw actuating means comprising a generally cylindrical element disposed coaxially of said jaw elements and having cam means internally thereof in position for movement along the cam surfaces on said jaw elements to open and close the latter, a second drive means extending through said upper body portion and terminating at its lower end with a rotatable nut which threadedly engages said jaw actuating means so as to provide for axial movement of the latter in response to rotation of said second drive means, said first and second drive means being coaxially disposed in said grappler and arranged to permit said relative transverse movement between said body portions without affecting the positioning of said jaw elements as determined by said drive means, and means carried by said lower body portion in encircling relation to said jaw mechanism which is arranged to yieldably engage and hold down articles surrounding the selected article to be lifted by said grappler during the initial engagement of the selected article and to maintain the surrounding articles in position during the initial upward movement of the selected article by said grappler.

11. Transfer mechanism for a nuclear reactor having a vertically disposed pressure vessel containing a reactor core, said transfer mechanism comprising a plurality of telescoping, tubular sections adapted to be placed above the pressure vessel in position for axial movement into the vessel, a radius arm pivotally supported on the lowermost of said sections for vertical swinging movement relative thereto, means connected with said tubular sections and radius arm for effecting axial movement thereof, for rotating said sections and radius arm about their central axis, and for swinging said radius arm relative to said sections, and a grappler pivotally supported on the outer end of said radius arm, said grappler comprising an upper body portion provided with a pair of horizontally disposed parallel bearing surfaces, a lower body portion suspended by means of a horizontally disposed planar element disposed between said bearing parallel surfaces so as to permit limited transverse movement, said lower body portion being rotatable and in vertical alignment with respect to said upper body portion, bearing means disposed between said planar element and said parallel bearing surfaces of said lower and upper body portions respectively, resilient biasing means coupling said planar element to said bearing means and said upper body portion providing a yieldable axial alignment of said upper and lower body portion, a first drive means extending through said upper body portion and connected with said lower body portion in a manner affording controlled rotation of the latter about its axis, a grappler jaw carried by said lower body portion and operable to releasably engage an element within the reactor core, said grappler jaw comprising a plurality of elongated jaw elements generally arcuate in cross-section and pivotally mounted intermediate their ends for relative movement about a generally horizontal axis, means defining vertically extending cam surfaces along the outer surfaces of said jaw elements, a jaw actuating means comprising a generally cylindrical element disposed coaxially of said jaw elements and having cam means internally thereof in position for movement along the cam surfaces on said jaw elements to open and close the latter, and a second drive means extending through said upper body portion and having at its lower end a rotatable nut which threadedly engages said jaw actuating means to provide for axial movement of the latter in response to rotation of said second drive means, said first and second drive means being coaxially disposed in said grappler and arranged to permit said relative movement between said body portions without affecting the positioning of said jaw elements.

12. Transfer mechanism for a nuclear reactor having a vertically disposed pressure vessel containing a reactor core, said transfer mechanism comprising a plurality of telescoping, tubular sections adapted to be placed above the pressure vessel in position for extension of the tubular sections to a position within the vessel, a radius arm pivotally supported on the lowermost of said sections for vertical swinging movement relative thereto, means connected with said tubular sections and radius arm for effecting axial movement thereof, for rotating said sections and radius arm about their central axis, and for vertically swinging said radius arm relative to said sections, and a grappler including an upper body portion provided with a pair of horizontally disposed parallel bearing surfaces, a lower body portion suspended by means of a horizontally disposed planar element disposed between said bearing surfaces so as to permit limited transverse movement, said lower body portion being rotatable and in vertical alignment with respect to said upper body portion, bearing means disposed between said planar element and said parallel bearing surfaces of said lower and upper body portions respectively, spring biasing means coupling said planar element to said bearing means and said upper body portion providing a yieldable axial alignment of said upper and lower body portions, a first drive means extending through said upper body portion and connected with said lower body portion in a manner affording controlled rotation of the latter about its axis, a grappler jaw carried by said lower body portion and operable to releasably engage an element within the reactor core, said jaw mechanism comprising a pair of elongated jaw elements generally arcuate in cross-section and pivotally mounted intermediate their ends for relative movement about a generally horizontal axis, means defining vertically extending cam surfaces along the outer surfaces of said jaw elements, a jaw actuating means comprising a generally cylindrical element disposed coaxially of said jaw elements and having cam means internally thereof in position for movement along the cam surfaces on said jaw elements to open and close the latter, a second drive means extending through said upper body portion and terminating at its lower end with a rotatable nut which threadedly engages said jaw actuating means to provide for axial movement of the latter in response to rotation of said second drive means, said first and second drive means being coaxially disposed in said grappler and connected with powered drive means carried by one of said telescoping sections, and means carried by said lower body portion in encircling relation to said jaw mechanism which is arranged to yieldably engage and hold down elements in the reactor core surrounding the selected element to be lifted by said grappler during the intiial engagement of the selected element and during the initial upward movement of the selected element out of the core.

References Cited in the file of this patent

UNITED STATES PATENTS

| 2,861,701 | Bergsland et al. | Nov. 25, 1958 |
| 3,039,949 | Newton et al. | June 19, 1962 |

FOREIGN PATENTS

| 1,226,658 | France | Feb. 29, 1960 |
| 1,236,554 | France | June 13, 1960 |